Aug. 21, 1951  D. O. KOCMICH  2,565,434
ELECTRICAL INDICATING DEVICE
Filed Dec. 7, 1949

Inventor
Donald O. Kocmich
By Kent W. Worrell
Atty.

Patented Aug. 21, 1951

2,565,434

UNITED STATES PATENT OFFICE 2,565,434

ELECTRICAL INDICATING DEVICE

Donald O. Kocmich, Western Springs, Ill.

Application December 7, 1949, Serial No. 131,631

9 Claims. (Cl. 201—48)

This invention relates in general to an electrical contact device and is more particularly described as a variable resistance pressure measuring device. In the measurement of variable resistance, particularly for delicate instruments and small wires, any pressure motion producing means for varying the resistance by contact with the wire frequently requires some appreciable force to move the contactor which engages the wire.

The present invention provides a contact of frictionless design so that any variation in resistance is not due to the force required to move the contact member over the resistance wire.

One of the principal objects of this invention therefor is to provide a means of variable resistance in conjunction with a pressure motion producing device so that appreciable force in the pressure sensitive element of a gauge to which it is applied is not required because of the frictionless design of the variable resistance.

A further object of the invention is to provide a frictionless fluid contact with a resistance wire.

A further object of the invention is to provide a movable contacting engagement for a resistance wire comprising an envelop surrounding the wire containing a conductor liquid which offers no resistance to the relative movement of the wire through the liquid and in which the liquid is contained by its surface tension.

Other objects of the invention will appear in the specification and will be apparent from the accompanying drawings in which, Fig. 1 is an axial fragmentary view taken through a fluid filled contact device of a simple type embodying the invention;

Figure 1:
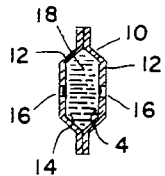
Figure 2:
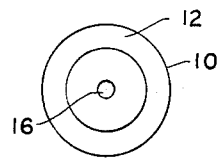
Fig. 2 is a side view of Fig. 1 showing that the shape of the fluid filled contact device is preferably circular.

Referring now more particularly to the drawings, a fluid filled contact 10 in a simple form, may consist of two dished plates 12 placed oppositely to form a substantial chamber 14 with opposite openings 16 preferably located axially or centrally in the chamber. The material of the contact device may be stainless steel, or any other suitable material suitably stamped or formed to provide a hollow chamber for containing a conductive fluid 18 such as mercury which is inserted within the chamber and of which the surface tension and the capillary relation is such that it will not pass except by pressure through the opening 16. The plates 12 are preferably secured together at their edges by soldering or welding and the plates are preferably circular with the opening 16 aligned at the opposite sides thereof.

Figure 3:
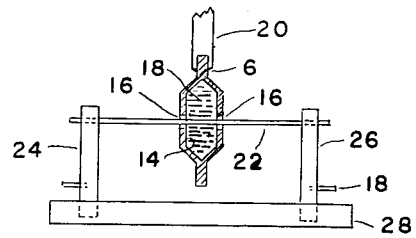
Fig. 3 is an axial fragmentary view taken through a fluid filled contact device and showing the relation of a resistive filament passing through the apertures of the contact chamber and establishing electrical connection through a conductive fluid which touches through the resistive filament and metal walls of the contact chamber.

As shown in Fig. 3, a contact device of this type is secured to a supporting arm 20 which transmits motion to the device and also provides electrical connection thereto. An electrical conductor 22 of fine wire such as platinum extends through the opposite apertures 16 and does not touch the metal sides of the apertures or the walls of the contact chamber because of the dimensional difference, as the apertures are larger in diameter than the conductor. The electrical conducting fluid 18 such as mercury provides electrical conductivity between the metal wall of the contact chamber and the conductor 22 without any mechanical friction developing between the filament and the walls of the chamber when the contact is moved relative to the filament. The ends of the filament are supported by metal posts 24 and 26 secured to an insulating base 28, the wire being soldered or otherwise firmly secured to the upper ends of the posts so that when the supporting arm 20 is moved in a straight line, there will be no frictional engagement between the wire 22 and the walls of the contact chamber.

Figure 4:
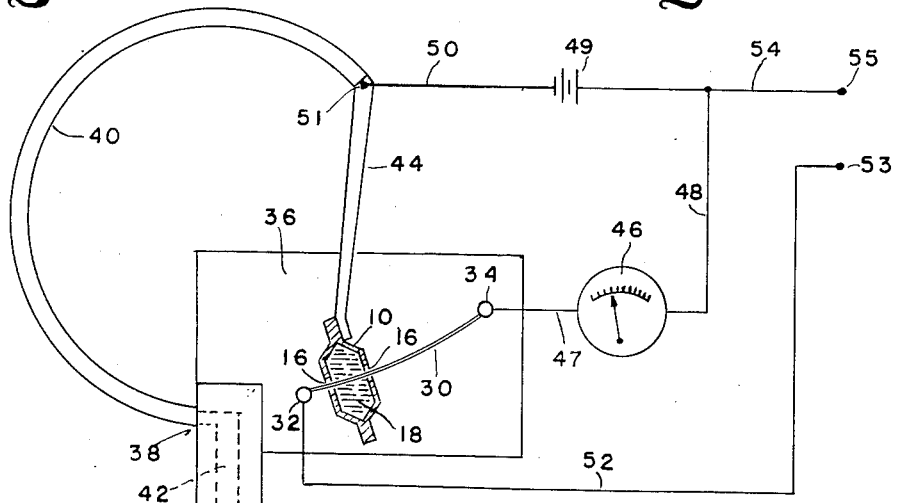
Fig. 4 illustrates one form of the invention in which the fluid filled contact device is arranged in connection with a Bourdon tube.

In the form of the invention shown in Fig. 4, a fluid filled contact 10 having a conductive fluid 18 such as mercury, makes contact with a curved resistive filament 30 supported between fixed posts 32 and 34 which provide means for electrical connection to the ends of the resistive filament. The supporting posts are held in a fixed position by means of the insulating supporting base 36 which has attached thereto a supporting block 38 for a flexible Bourdon tube 40, the block 38 having a passage 42 therethrough for supplying pressure to the tube which tends to flex the tube due to the pressure, in a well known manner.

Connected at the free end of the Bourdon tube is an arm 44 and the outer end of the arm is secured to the fluid filled contact 10. By applying pressure to the Bourdon tube through the block 38, the tube is flattened more or less and motion is transmitted to the arm and to the contact device so that a change of resistance between the contact device 10 and the terminal ends of resistive filament takes place in accordance with the movement of the contact device for accomplishing any desired result.

An electrical instrument 46 may be connected by a conductor 47 to one of the instrument posts 34 and by a conductor 48 with one end of a battery 49 or other source of current supply, the other end of the battery being connected by a conductor 50 with a terminal 51 on the arm 44 which is directly connected to the contact device 10. Any movement of the contact device will cause a change in resistance between it and the post 34 which will be shown by the instrument 46. Another circuit may also be set up from the other side of the contact device to the post 32 and by means of a conductor 52 to a terminal 53. A conductor 54 has a terminal 55 and is connected through conductor 48 to one side of the battery 49. This provides an energizing or operating circuit including the battery 49 and the resistance wire from the contact device to the post 32 having the terminals 53 and 55.

Figure 5:
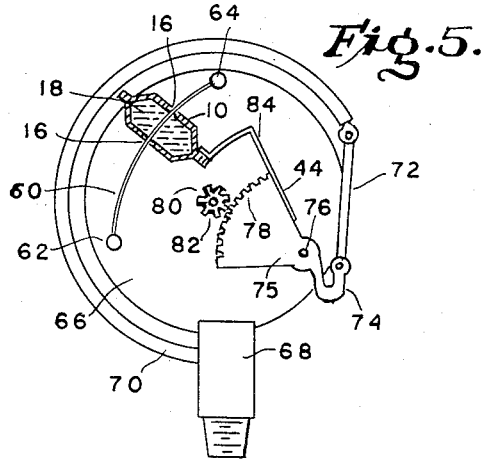
Fig. 5 illustrates the invention with its fluid filled contact device attached to a secondary lever link to a Bourdon tube so that the movement of the tube is mechanically amplified to produce a large relative movement of the contact device.

In this manner, the change of resistance caused by the Bourdon tube may be observed and an energizing circuit may be closed through the other portion of the resistance wire. In the form of the invention shown by Fig. 5, a contact device 10 is connected to a resistive filament 60 between posts 62 and 64 secured to a base 66 having an attached fitting 68 for supplying pressure to a Bourdon tube 70. The free end of this tube is pivotally connected to one end of a link 72 and the other end of the link is pivotally connected to an arm 74 of a lever 75 mounted intermediate its ends upon a pivot 76 supported by the base 66, and the other end of the lever having a gear segment 78 which meshes with a gear 80 mounted on a shaft 82 supported by the base 66. The ratio of the arms 74 and the arm formed by the gear segment 78 is such that the movement of the Bourdon tube is amplified by the lever 75 and may be transmitted through the gear 80 to a measuring or indicating instrument.

Also secured to the gear segment 78 by means of an arm 84 is the contact device 10 which is mounted for movement upon the resistive filament 60. This filament is preferably curved between the supporting posts 62 and 64 so that as it is moved, a frictionless electric contact is made at all times with the conductive liquid 18 inside of the device without frictionally engaging the walls of the device. The terminal posts 62 and 64 and the contact device 10 may be connected as shown in Fig. 4 to suitable indicating and operating electrical circuits. In this form, the movement of the Bourdon tube is mechanically amplified by the connections of the lever changing the relative position of the contact device varying the electrical resistance so that a change in resistance as measured is proportional to the pressure as applied to the Bourdon tube. The shaft 82 of the gear 80 may be directly connected to a gauge which indicates the position of the contact device 10 relative to the resistive wire, and therefore it may indicate the resistance of either portion of the wire.

Figure 6:
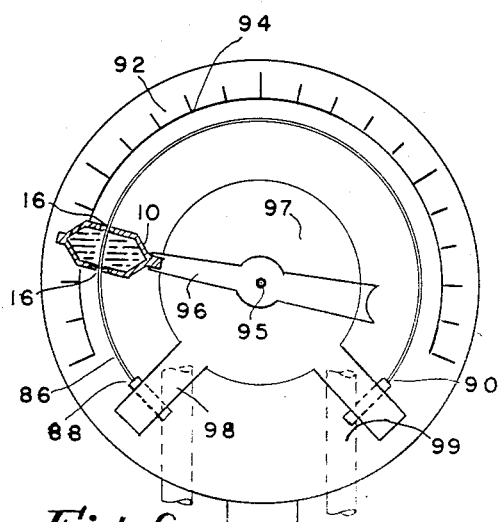
Fig. 6 shows another form of the invention in which the fluid filled contact device is attached to a pointer of a dial calibrated type of pressure gauge.

In another form of the invention as shown in Fig. 6, a resistance filament 86 in circular form embracing more than a semi-circle is mounted at its ends on posts 88 and 90 secured to a base 92 of an instrument having a graduated dial 94 arranged about the center of the instrument. An operating shaft 95 at the center of the instrument has an attached arm 96 to which a contact device 10 is rigidly attached at one end so that the outer extremity may constitute the extremity of a pointer, the resistive filament extending through the opposite openings 16 and in contact with the conductive liquid 18 in the device. The instrument also comprises suitable power means, pressure responsive devices, such as diaphragm bellows, or Bourdon tubes of any well known construction mounted in a casing 97 for receiving differential pressure through tubular connections 98 and 99 such that motion is imparted to the shaft 95 upon which the contact device is also mounted by means of the arm 96. When pressure is applied to the gauge at the differential connection 98, 99, the pointer is caused to rotate relative to the dial of the gauge and the contact device is moved relatively to the resistance filament changing the resistance as measured from the ends so that the resistance change may be proportional to the change in pressure as applied to the gauge.

Several uses and applications are thus shown of the frictional electrical contact device of this invention, showing a practical application as applied to the changing of resistance for delicate instruments and similar applications where frictionless movement of the contact device is advantageous. This is particularly desirable in controlling instruments where only a slight movement is necessary to produce a desired change. It is particularly desirable in gauges, meters, and other instruments which usually take only a small amount of current and in which a small movement is effective to produce a change in some operating mechanism, as for example, in the heat control of an oil burner for domestic or commercial heating, and other similar applications.

While the invention has been thus described in different forms and applications, they should be regarded by way of illustrations and examples rather than restrictions or limitations thereof, as many changes in the construction, combination and arrangement of the parts may be made without departing from the spirit and scope of the invention.

I claim:

1. An electrical frictionless contact device, comprising means forming a metal chamber having apertures on opposite sides of the chamber, an electrical conductor extending through the chamber and apertures and less in size than the apertures to extend freely therethrough, and a conducting fluid within the chamber and engaging the resistance wire and adapted to change the resistance of the parts of the conductor outside of the chamber when the conductor and chamber are relatively moved.

2. An electrical frictionless contact, comprising a metal chamber having opposite apertures of small dimensions, a resistance wire smaller than the apertures extending therethrough, and a conducting liquid in the chamber and making contact with the metal wall and with the resistance wire to change the resistance thereof at both sides of the liquid when the wire and liquid are relatively moved, the liquid being maintained in the chamber by its surface tension.

3. An electrical frictionless contact, comprising metal forming a chamber with sides having opposite apertures, a resistance filament extending movably through the apertures and the chamber and of a size to extend freely through the apertures without touching the metal, and a conducting liquid such as mercury maintaining a connective electrical contact between the filament and the metal forming the chamber to change the relative resistance of the parts of the filament at opposite sides of the chamber depending upon the relative movement of the chamber and filament.

4. An electrical frictionless contact, comprising metal forming a chamber having apertures located in opposite walls of the chamber, a conductive liquid such as mercury in the chamber, a conductor filament extending through the apertures of the chamber and through the conductive liquid therein, the filament being smaller in size than the apertures, means mounting the metal forming the chamber for movement in a determined path, and means mounting the ends of the filament in the path of movement of the metal chamber so that the filament remains in contact with the conducting fluid within the chamber but the filament does not engage the metal sides of the chamber, the resistance of the portions of the filament at the sides of the chamber changing as the filament is moved in the chamber.

5. A combination with a resistance filament and means for mounting it in a predetermined path between fixed terminals, an electrical frictionless contact device, comprising means forming a metal chamber having opposite apertures through which the filament extend, a conductive fluid retained in the chamber by its surface tension surrounding the filament and making electrical contact with the interior of the chamber, and means supporting the metal chamber to move it in the predetermined path of the filament to change the relative resistances of the portions of the filament at the sides of the chamber.

6. The combination with a metal filament and means for maintaining it in a predetermined path, of an electrical frictionless contact therefor, comprising a metal chamber having opposite apertures, means through which the metal filament extend, a conductive liquid in the chamber in contact with the filament and with the inner wall of the chamber, the liquid having a surface tension and capillary relation such that it is retained in the chamber, means for supporting and moving the contact chamber in the path of the filament to change the resistance of either portion of the filament outside of the chamber, and electrical conductor means connected to the contact chamber and to the filament terminals.

7. An electrical frictionless contact device, comprising a metal chamber having opposite apertures, a conductive fluid within the chamber, a resistance filament extending through the apertures and the chamber in contact with the fluid, the filament being smaller than the apertures to pass freely therethrough, means for holding the resistance filament in a fixed path, means for mounting the metal chamber to move in the path of the filament so that the walls of the apertures will be free from engagement with the filament and to change the resistance of those portions of the filament outside of the chamber, power means for actuating the said mounting means, and a gauge in connection with the mounting means for indicating the relative position of the contact device to the resistance filament.

8. An electrical frictionless contact device, comprising a resistance wire and means for mounting it in a predetermined path, means forming a metal walled chamber having opposite apertures through which the wire extends, a conductive fluid in the chamber retained therein by its surface tension in contact with the wire and with the innerwall of the chamber, means mounting the chamber for movement in the path of the wire maintaining the walls of the apertures free from engagement with the wire, the resistances of the end portions of the wire outside of the chamber being relatively changed by the movement of the chamber with respect to the wire, said means comprising a lever having arms of different lengths, the longer arm connected to the chamber and power means connected to the shorter arm of the lever, the lever magnifying the movement of the chamber imparted to it by the power means.

9. An electrical frictionless contact device in accordance with claim 8, in which the lever also includes a segmental rack for engaging a gear to rotate an indicating instrument shaft.

DONALD O. KOCMICH.

REFERENCES CITED

The following references are of record in the file of this patent:

UNITED STATES PATENTS

| Number | Name | Date |
| --- | --- | --- |
| 1,289,637 | Bruce | Dec. 31, 1918 |

FOREIGN PATENTS

| Number | Country | Date |
| --- | --- | --- |
| 199,632 | Great Britain | June 28, 1923 |